(12) United States Patent
Gruber et al.

(10) Patent No.: US 7,124,903 B2
(45) Date of Patent: *Oct. 24, 2006

(54) OFFSET BASE STORAGE RACK ASSEMBLY

(75) Inventors: Robert D. Gruber, Hendersonville, NC (US); Allen B. Kautz, Wheaton, IL (US)

(73) Assignee: Interlake Material Handling, Inc., Naperville, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 10/768,216

(22) Filed: Jan. 30, 2004

(65) Prior Publication Data

US 2004/0181922 A1    Sep. 23, 2004

Related U.S. Application Data

(60) Continuation of application No. 10/374,244, filed on Feb. 25, 2003, now Pat. No. 6,718,609, which is a division of application No. 09/748,507, filed on Dec. 26, 2000, now Pat. No. 6,557,712, which is a continuation of application No. PCT/US00/20054, filed on Jul. 21, 2000.

(60) Provisional application No. 60/147,710, filed on Aug. 6, 1999.

(51) Int. Cl.
    *A47B 43/00* (2006.01)
(52) U.S. Cl. ....................... 211/189; 211/191
(58) Field of Classification Search ............... 29/401.1; 211/189, 191, 192, 183; 248/188
    See application file for complete search history.

(56) References Cited

U.S. PATENT DOCUMENTS

| 914,572 | A | 3/1909 | Holden |
|---|---|---|---|
| 2,208,237 | A | 7/1940 | Williams et al. |
| 2,575,461 | A | 11/1951 | North |
| 2,710,241 | A | 6/1955 | Lieberman |
| 3,329,282 | A | 7/1967 | Swan et al. |
| 3,557,966 | A | 1/1971 | Skubic |
| 3,616,937 | A | 11/1971 | Frame |
| 3,785,502 | A | 1/1974 | Konstant |
| 3,848,747 | A | 11/1974 | Thompson |
| 3,857,494 | A | 12/1974 | Giardini |
| 3,877,579 | A | 4/1975 | Weider |
| 3,911,548 | A | 10/1975 | Perry |
| 3,928,905 | A | 12/1975 | Atwater |
| 4,030,611 | A | 6/1977 | Konstant |
| 4,092,815 | A | 6/1978 | Rowley et al. |
| 4,102,108 | A | 7/1978 | Cody |
| 4,117,938 | A | 10/1978 | Klein |
| 4,204,601 | A | 5/1980 | Thomas |
| 4,261,470 | A | 4/1981 | Dolan |
| 4,697,534 | A | 10/1987 | Kettlestrings |
| 4,773,547 | A | 9/1988 | Bell |
| 4,819,816 | A | 4/1989 | Noble, Sr. |
| 4,884,318 | A | 12/1989 | Hazenbroek |
| 4,981,225 | A | 1/1991 | Cole |
| 5,012,938 | A | 5/1991 | King |
| 5,123,126 | A | 6/1992 | Vincent |
| 5,316,428 | A | 5/1994 | Charping et al. |
| 5,379,904 | A | 1/1995 | Brown |
| 5,638,917 | A | 6/1997 | Vennen |

(Continued)

*Primary Examiner*—John C. Hong
(74) *Attorney, Agent, or Firm*—Camoriano and Associates; Theresa Fritz Camoriano

(57) ABSTRACT

A storage rack assembly includes a base detachably secured to the storage rack. The base has a recessed bottom portion closest to the aisle to protect the front legs from accidentally being hit by a forklift truck.

35 Claims, 8 Drawing Sheets

U.S. PATENT DOCUMENTS

| | | |
|---|---|---|
| 5,957,425 A | 9/1999 | Conway et al. |
| 6,123,208 A | 9/2000 | Haenszel |
| 6,135,419 A | 10/2000 | Hutson, Jr. et al. |
| 6,254,063 B1 | 7/2001 | Rohde et al. |
| 6,260,719 B1 | 7/2001 | Azzopardi et al. |
| 6,298,537 B1 | 10/2001 | Dion |
| 6,405,884 B1 | 6/2002 | Dion |
| 6,557,712 B1 * | 5/2003 | Gruber et al. ............... 211/189 |
| 6,718,609 B1 * | 4/2004 | Gruber et al. ............. 29/401.1 |
| D490,678 S | 6/2004 | Dion |

* cited by examiner

OFFSET BASE STORAGE RACK ASSEMBLY

This application is a continuation of U.S. patent application Ser. No. 10/374,244, filed Feb. 25, 2003, now U.S. Pat. No. 6,718,609 which is a divisional of Ser. No. 09/748,507 filed Dec. 26, 2000 now U.S. Pat. No. 6,557,712, which is a continuation of PCT/US00/20054, filed Jul. 21, 2000, which claims priority from U.S. Provisional Application Ser. No. 60/147,710, filed Aug. 6, 1999, all of which are hereby incorporated herein by reference. This invention relates to storage racks, and, more particularly, to improved versions of storage rack assemblies designed for high density storage of goods delivered by power driven lift equipment such as fork trucks.

BACKGROUND OF THE INVENTION

Since warehouse space for storage of goods is expensive, there are many advantages to an efficient and well organized vertical storage rack system which will allow the storage of goods in an orderly fashion. Since the products are stacked vertically, optimum use of the floor space may be achieved. The disadvantage is that the goods to be stored must now be raised to the height of the rack where they are to be stored. The moving and especially the raising of the goods is most efficiently accomplished via fork trucks.

In as much as fork trucks require aisles to travel to the desired location to either store or retrieve goods from a particular rack, this aisle space is not available for storage. To maximize the storage area given a limited number of square feet in a building or warehouse, one must minimize the area reserved for aisle space for the fork trucks.

Unfortunately, as one reduces the size of these aisles, the room to maneuver for the fork trucks is also reduced, and the end result is that the fork trucks sometimes hit the storage racks, damaging the fork trucks as well as the storage racks.

Prior art (Konstant U.S. Pat. No. 3,785,502; Klein U.S. Pat. No. 4,117,938) has taught the use of recessed legs towards the bottom of the rack in order to give more room to maneuver to the fork trucks at the ground level. This has typically been accomplished by angling back the front legs (the legs closest to the aisles), which puts these legs out of harm's way. However, the weight of the storage rack and of the goods stacked thereupon is then concentrated on this angled leg, and substantial use of struts and reinforcing members is required. This makes it very difficult, if not impossible, to retrofit existing storage racks in the field. The retrofit, if possible, is difficult, expensive, and time consuming, and requires specialized skills, such as a good welder to complete the task. Furthermore, while the bottom of the angled legs is far removed from the aisles, the closer one gets to the top portion of the angled legs, the closer one is to the aisle and to the distinct possibility of having a fork truck run into the angled leg. Also, since the prior art designs use the same upright members for the entire storage rack, the only way to beef up one portion of the upright is to beef up the entire height of the rack.

SUMMARY OF THE INVENTION

The present invention provides an offset frame, which may be field-installed by bolting onto a storage rack. This design provides the following distinct advantages over the prior art:

The base is designed and manufactured as a completely separate piece from the storage rack itself. Thus, an existing storage rack may be raised (or cut off) and placed on top of the base without any additional bracing, struts, or reinforcing members being required of the existing structure. Furthermore, for completely new installations, manufacturing the top and bottom sections separately makes both of them easier to manufacture and install.

The base is designed with the front legs (closest to the aisles) offset back from the aisle. In the preferred embodiments shown here, the front legs are substantially vertical, such that the entire leg is set back and away from where the fork trucks travel.

Since the base is a completely separate member, it may be made of heavier members than the rest of the rack in order to support the cantilevered storage rack load without increasing the cost of the rest of the rack. Indeed, all the base members may be made from heavy structural members that enhance the frame's strength and abuse resistance, while the storage rack itself may be manufactured of lighter gauge materials to save on manufacturing costs and to reduce the weight of the structure.

The present invention simply bolts a cantilevered base onto the bottom of a storage rack, which readily permits modification of existing frames in the field to turn an ordinary rack into an offset rack. Using separate base and top members, using heavier structural members for the base than for the top, and the all-bolted capability contribute to this ease of retrofitting an existing storage rack.

DETAILED DESCRIPTION OF THE PREFERRED EMBODIMENTS

Figure 1:
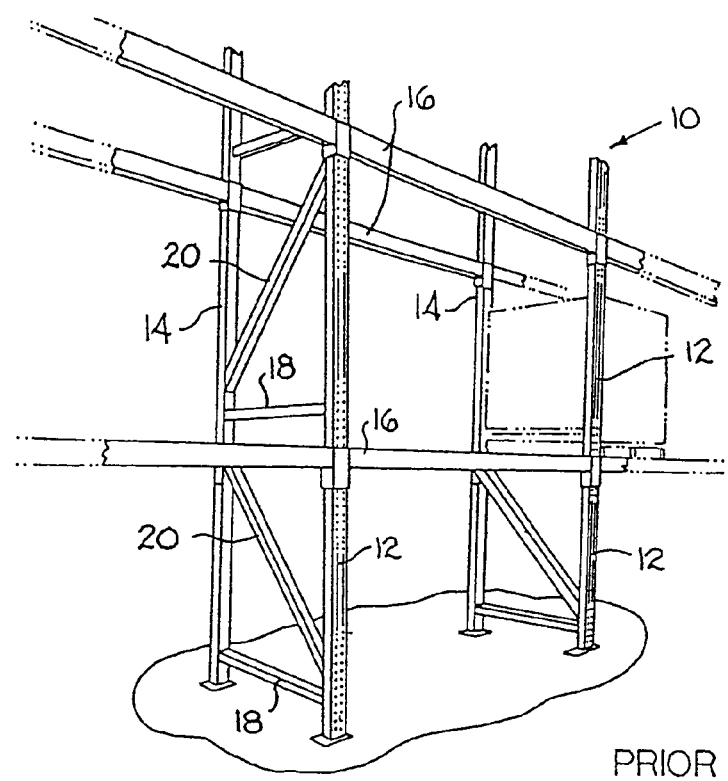
FIG. 1 is a front perspective view of a prior art storage rack.

FIG. 1 shows an example of a prior art rack that may be retrofitted to make a rack in accordance with the present invention. A first preferred embodiment of the present invention is shown in FIGS. 2–6. A second preferred embodiment is shown in FIGS. 7–11.

The rack 10 of FIG. 1 has a plurality of forward legs 12, a plurality of rear legs 14, and horizontal beams 16 interconnecting the forward and rear legs 12, 14 to form shelves to support products. Each pair of forward and rear legs 12, 14 also includes horizontal forward-to-rear supports 18 and angled forward-to-rear supports 20. This rack encounters the problems discussed above with respect to prior art racks, which may be hit by forklift trucks maneuvering along the aisles in a warehouse.

Figure 2:
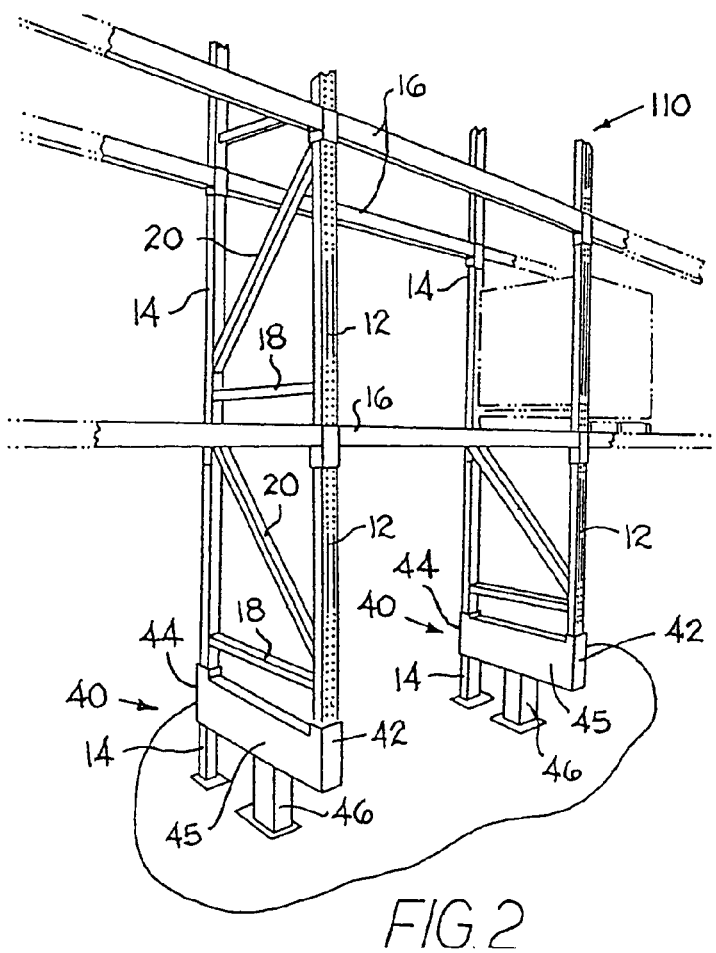
FIG. 2 is a front perspective view of a first embodiment of a rack made in accordance with the present invention.

FIG. 2 shows a rack that is recessed at the bottom to greatly reduce the opportunity for impact with the forklift trucks. The forward portion of the rack terminates above the recess in order to create a cantilevered arrangement with the recess at the bottom. This rack 110 may be made in this form initially, or it may be made by retrofitting the prior art rack of FIG. 1. This rack also has front legs 12, rear legs 14, horizontal beams 16, horizontal forward-to-rear supports 18, and angled forward-to-rear supports 20. In addition, it has a base 40 at each pair of forward and rear legs 12, 14. The base 40 is shown in detail in FIGS. 3 and 4. Each base 40 has a front receptacle 42 and a rear receptacle 44. A structural member 45 connects the front and rear receptacles 42, 44 together, and a support leg 46 projects downwardly from the structural member 45 and terminates at ground level with a foot 47, which bolts into the floor between the front and rear receptacles 42, 44.

Figure 4:
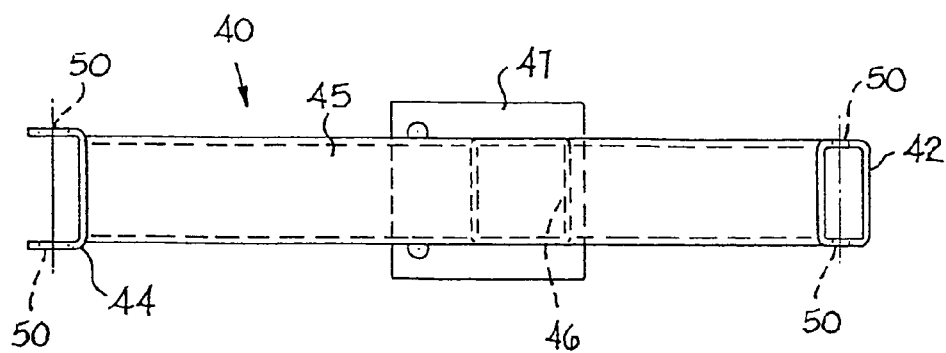
FIG. 4 is a top view of the base of FIG. 3.
Figure 3:
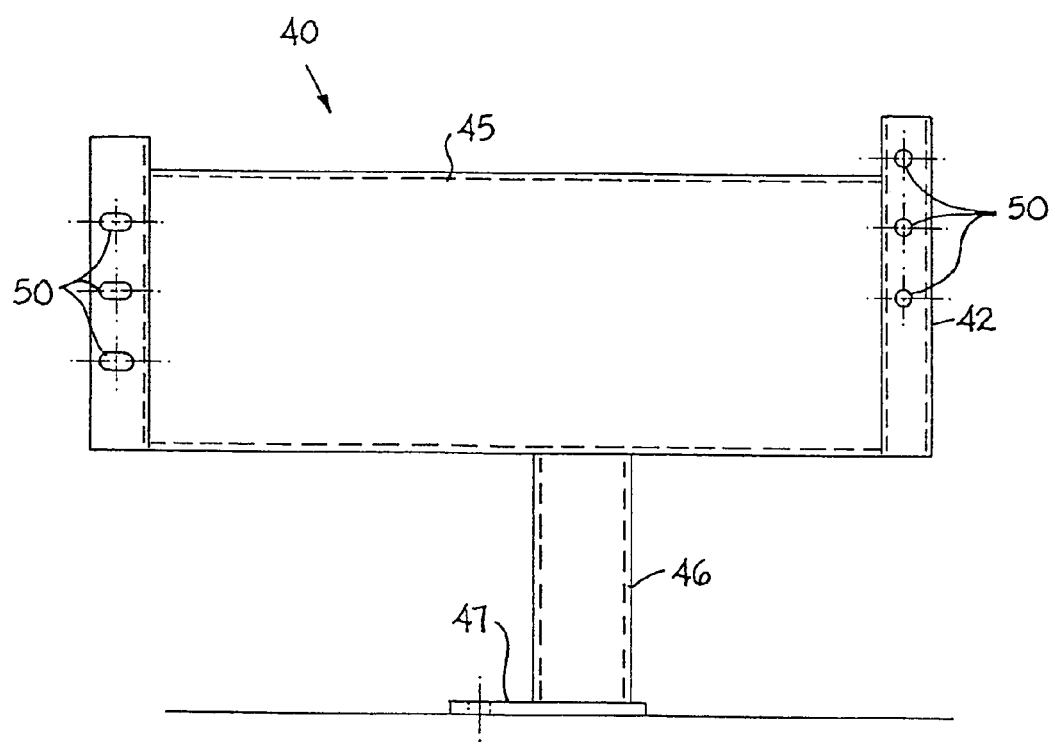
FIG. 3 is a side view of the base portion of the rack of FIG. 2.
Figure 5:
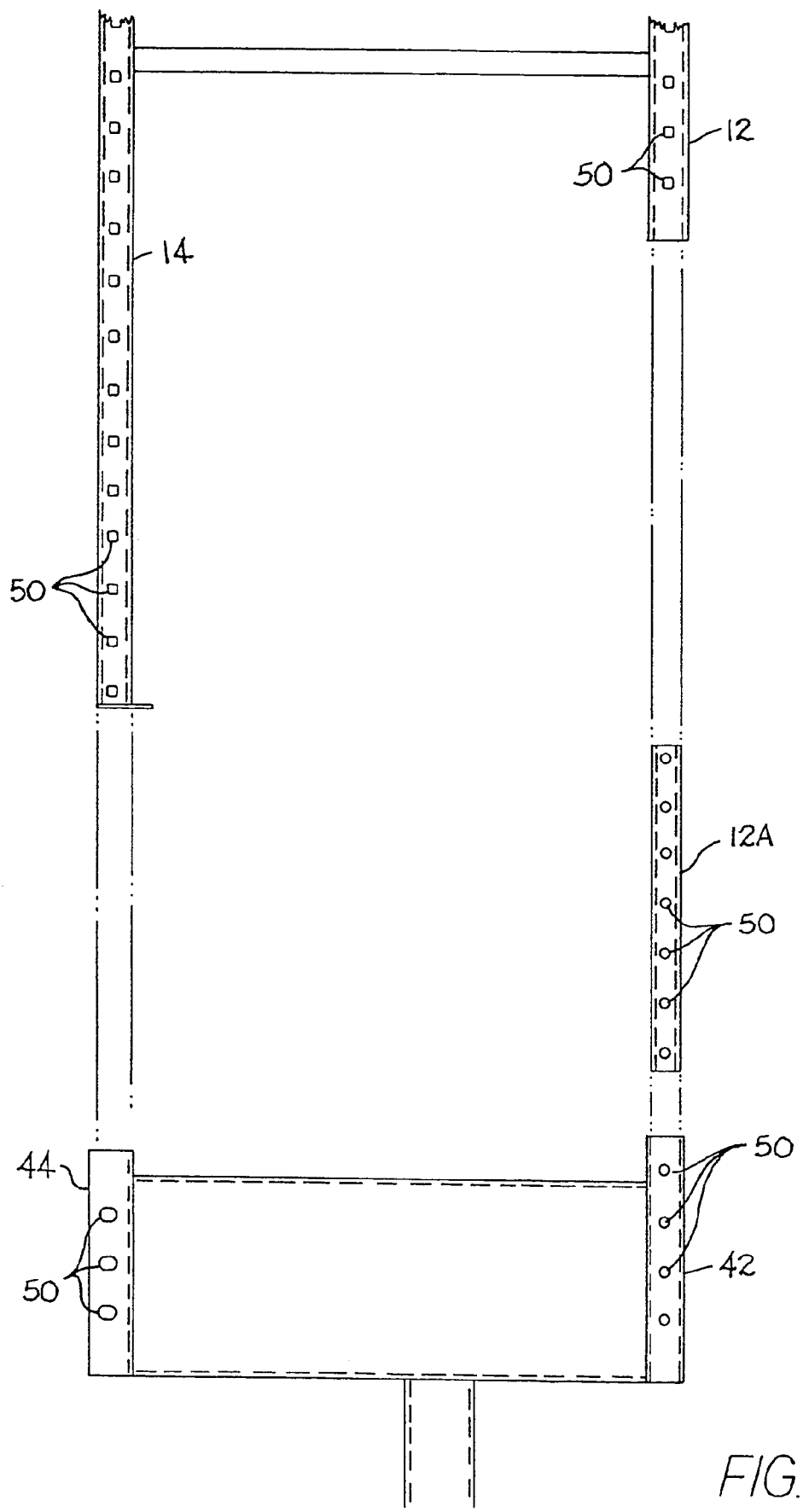
FIG. 5 is a side view of the rack of FIG. 2 as it is being assembled.
Figure 6:
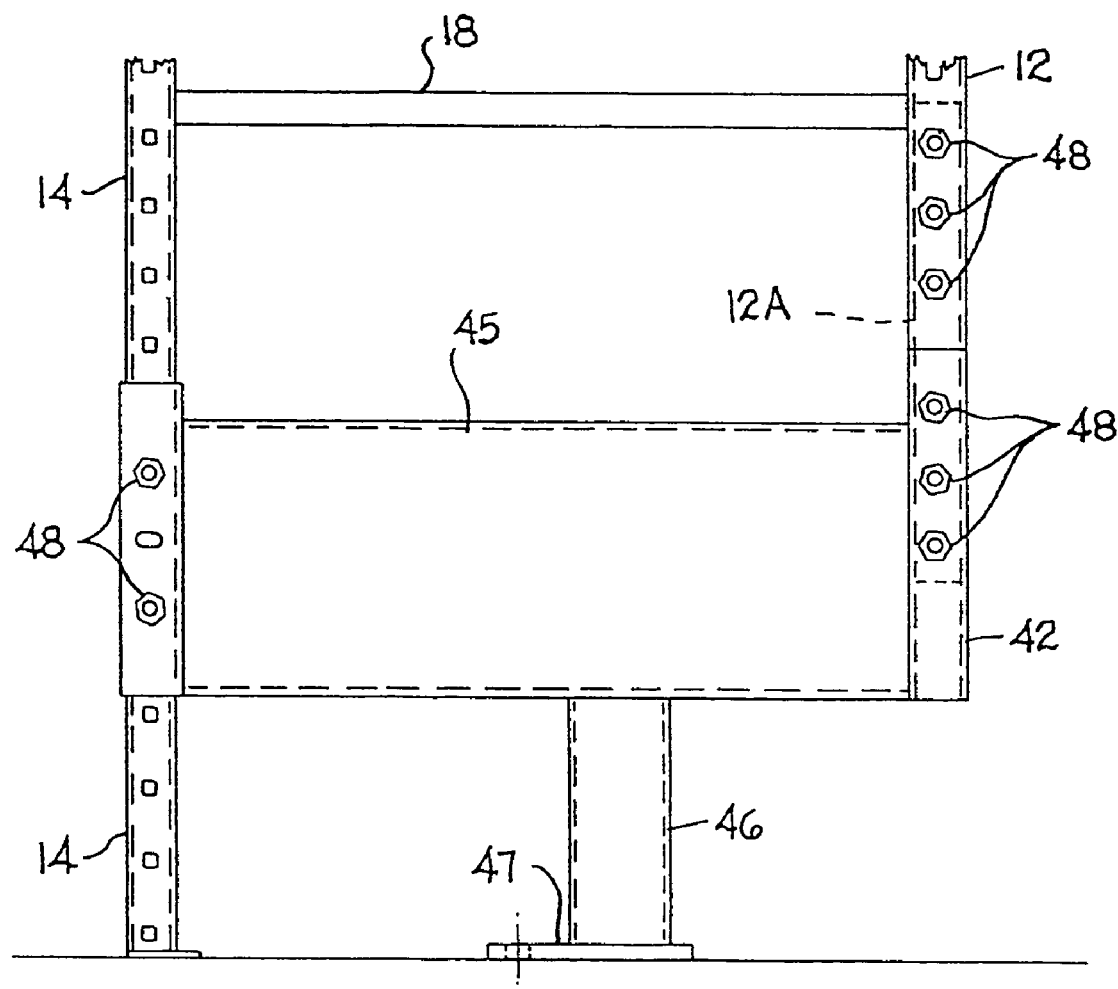
FIG. 6 is a side view of the bottom portion of the rack of FIG. 2.
Figure 7:
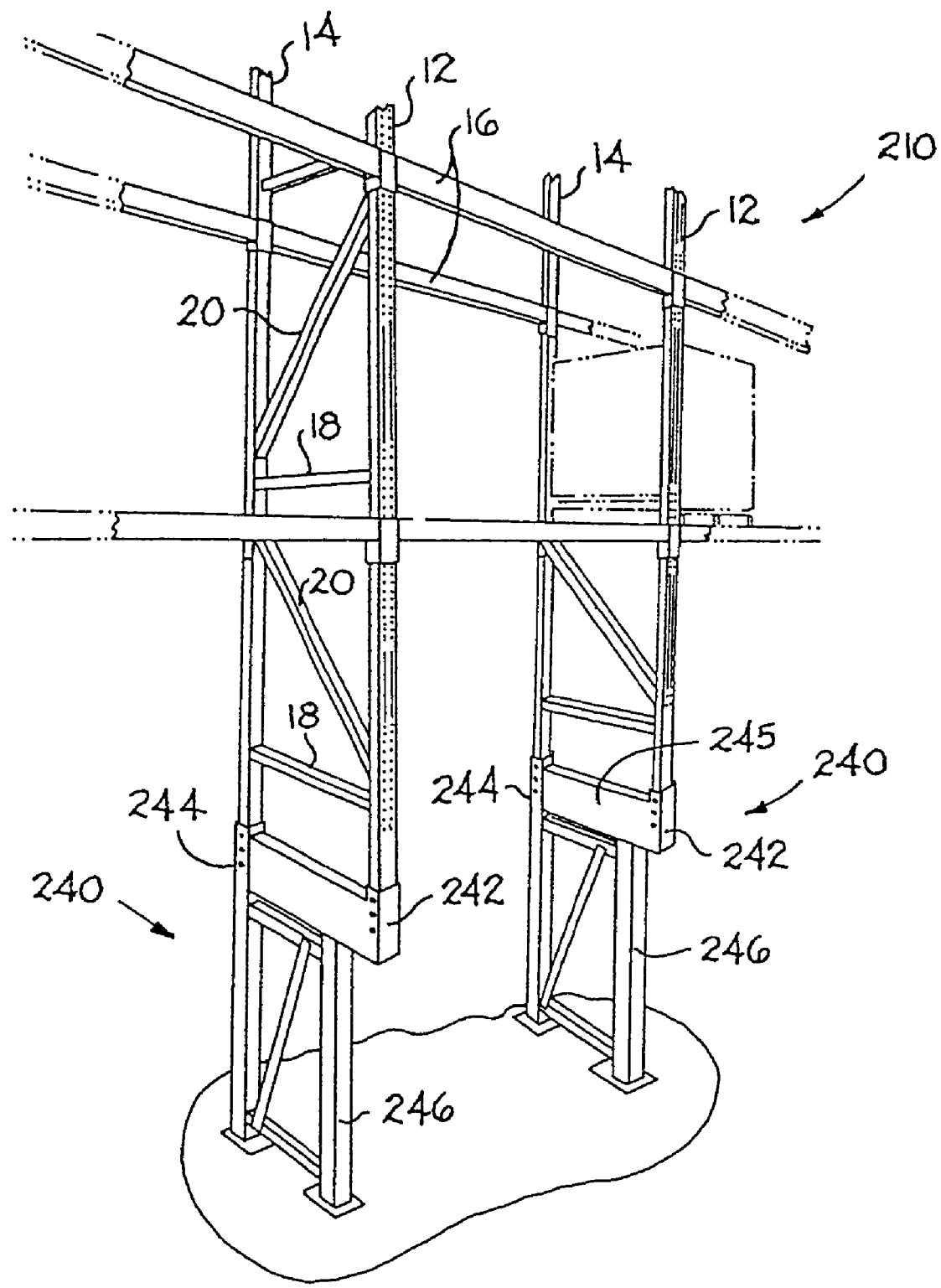
FIG. 7 is a perspective view of a second embodiment of a rack made in accordance with the present invention.
Figure 9:
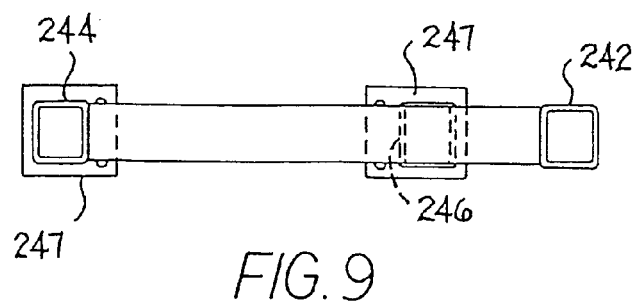
FIG. 9 is a top view of the base of FIG. 8.
Figure 8:
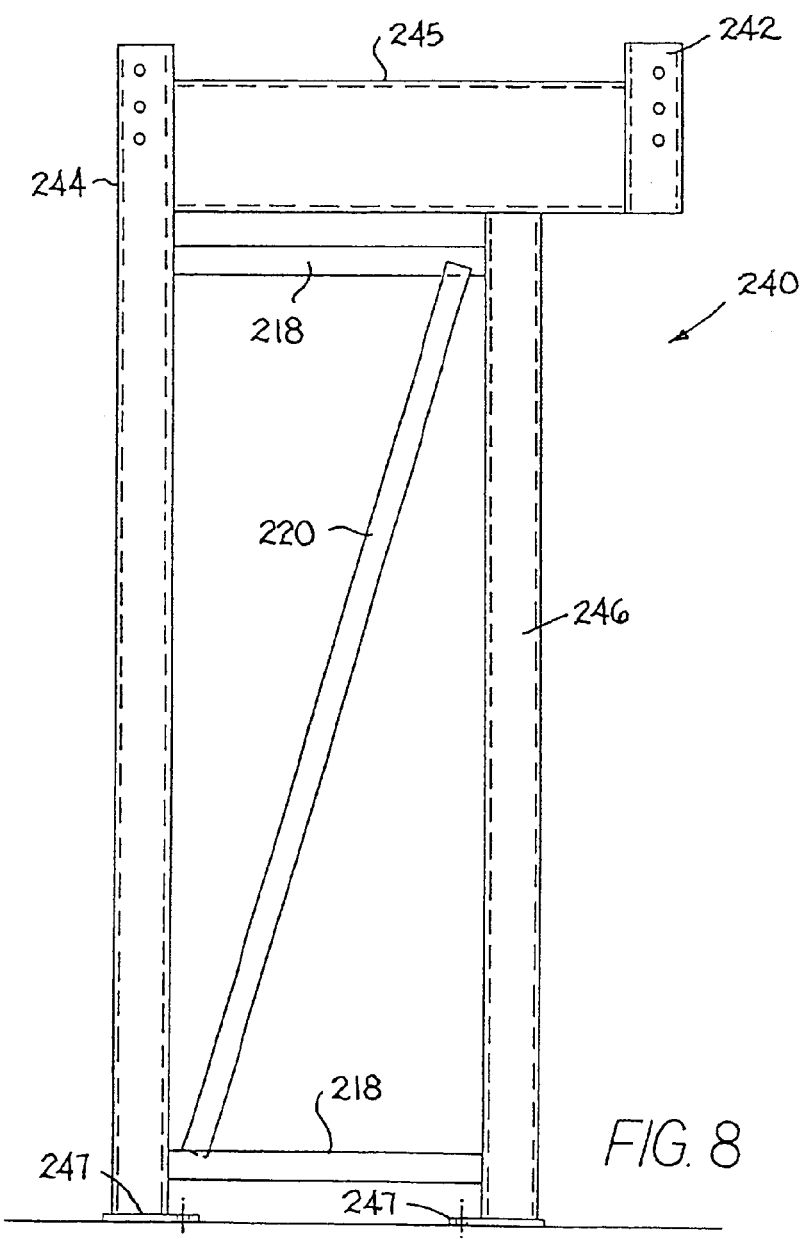
FIG. 8 is a side view of the base of the rack of FIG. 7.
Figure 10:
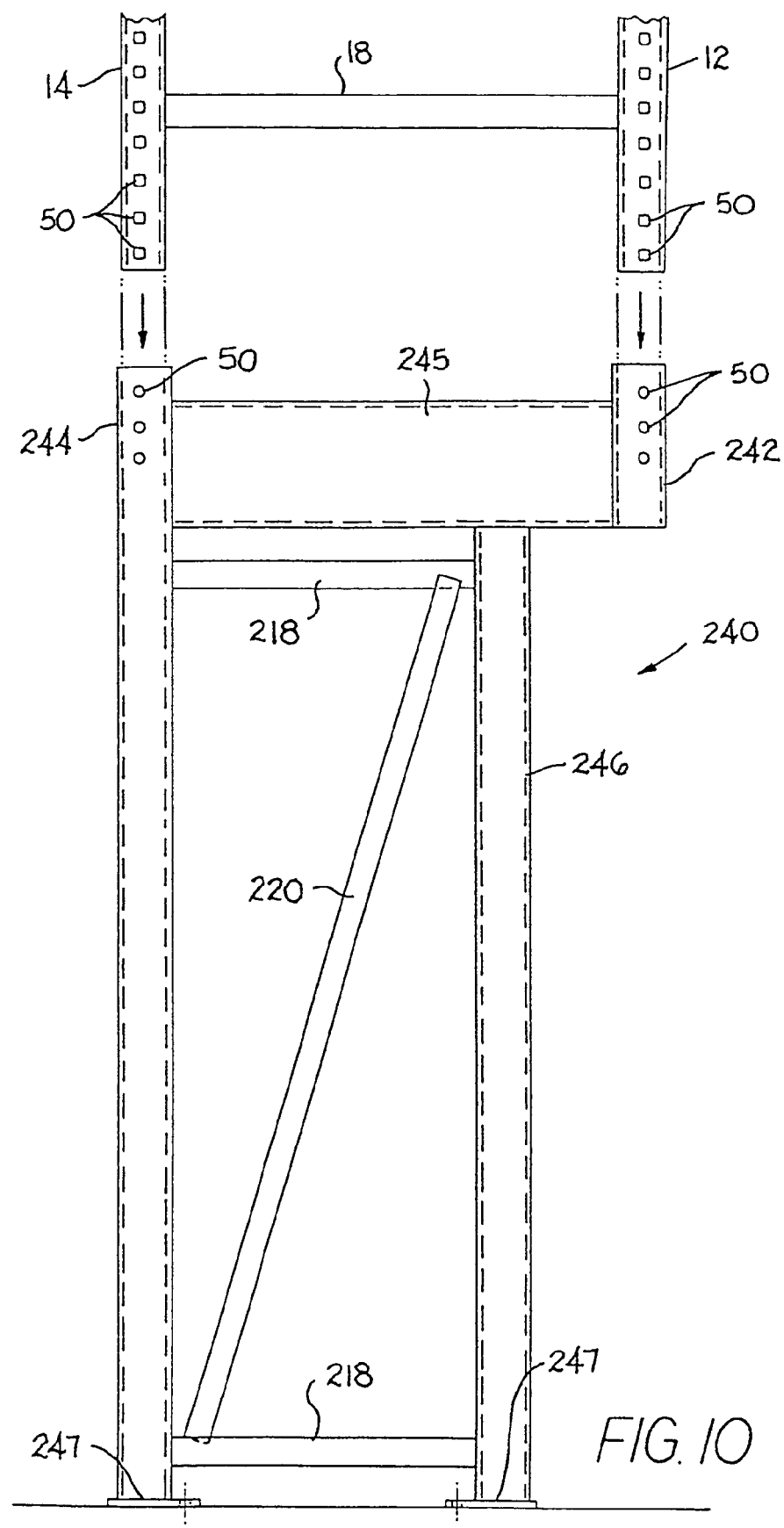
FIG. 10 is side view of the rack of FIG. 7 being assembled.
Figure 11:
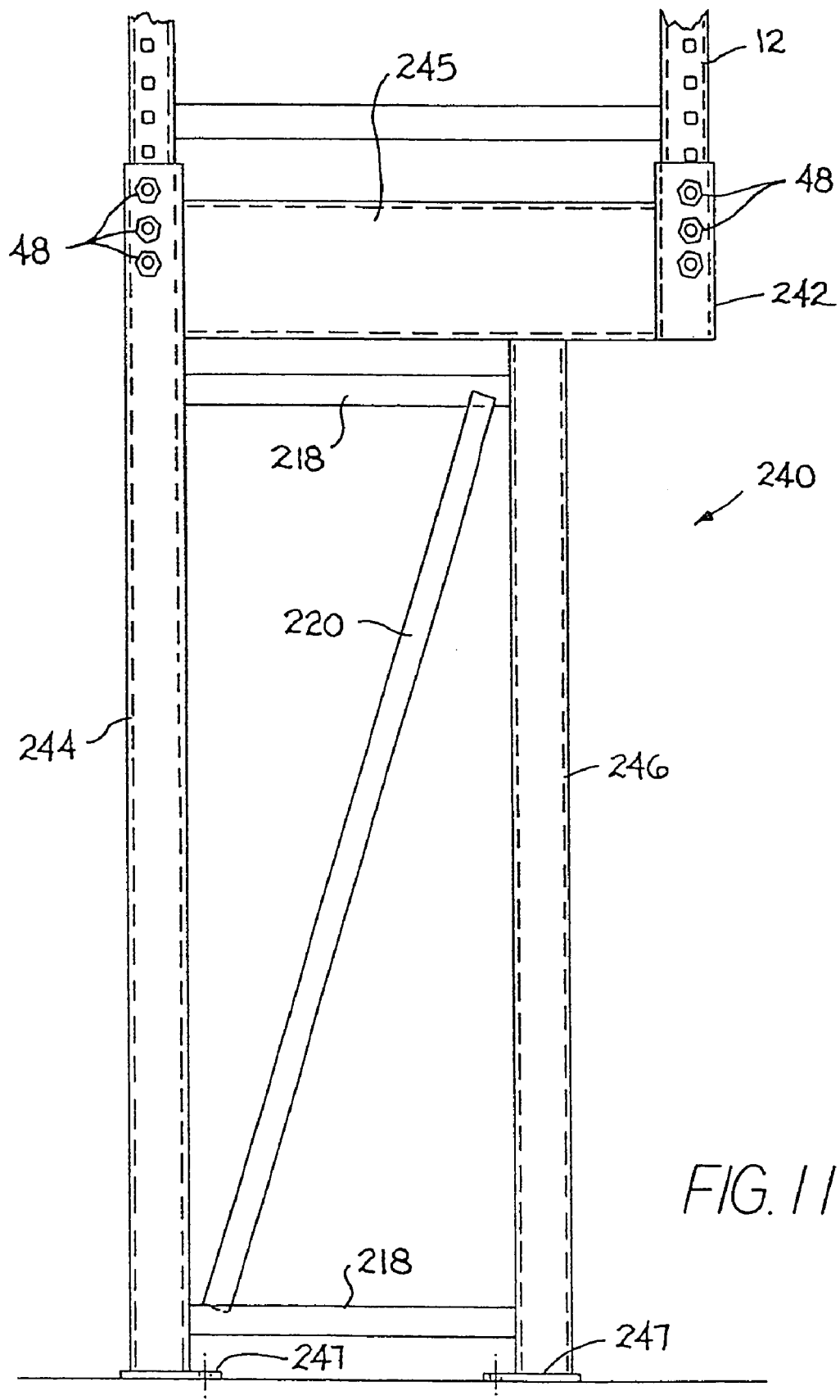
FIG. 11 is a side view of the bottom portion of the rack of FIG. 7.

FIGS. 5 and 6 show how the rack is assembled onto the base 40. The front leg 12 of the rack is a channel, which is shorter than the rear leg 14. If the rack 10 of FIG. 1 is being retrofitted, the front leg 12 would be cut off at the desired height, and any cross members 18, 20 that were connected to the portion of the front leg that is cut off would also be removed. The front leg 12 receives internally the upper portion of a splice member 12A, which preferably is a rectangular or C-shaped structural member. The lower portion of the splice member 12A is received in the front receptacle 42. The receptacle 42 and the front leg 12 are secured to the splice member 12A by fasteners, which, in this preferred embodiment, are bolts 48, extending through holes 50 in the leg 12 and the splice member 12A or through holes 50 in the receptacle 42 and the splice member 12A. The rear leg 14 of the rack extends through the rear receptacle 44 to the ground level and is secured to the rear receptacle 44 by bolts 48 extending through holes 50 in the rear leg and the rear receptacle 44. As shown in FIG. 4, in this preferred embodiment, the front receptacle 42 is a rectangular-shaped structural beam, and the rear receptacle 44 is a C-channel-shaped structural beam.

FIG. 6 shows the bottom portion of the assembled offset rack 110. It can be seen that the support leg 46 of the beam 45 and the rear leg 14 of the rack rest on the ground, while the front leg 12 and front receptacle 42 are elevated off of the ground a desired distance, which usually is in the range of six inches to thirty-six inches for a rack that is retrofitted and six inches to ninety-six inches for a new rack. The support leg 46 is recessed back from the front receptacle 42 a distance of about six to twenty-four inches.

The base 40 has a front-to-rear width at an elevated position (i.e. at the elevation of the front receptacle 42) that is substantially greater than its front-to-rear width at an elevation closer to the ground, due to the cantilevered nature of the base 40. As was explained earlier, by being cantilevered, the front portion of the base 40 defines an open space between the base and the ground that usually has a height in the range of six inches to thirty-six inches for a retrofitted rack and in the range of six inches to ninety-six inches for a new rack. That open space extends from an imaginary vertical line extending through the front of the front receptacle a distance of about six to twenty-four inches in a direction toward the rear of the base.

When a prior art rack 10 of FIG. 1 is being retrofitted to make the offset rack of FIG. 2, it is not necessary to move the original rack 10 or even to unload it. The retrofit may be done simply by providing an external support for the front legs 12 above the point where they are to be cut off, cutting them off, and installing the splice member 12A and the base 40. This does not require welding or a substantial amount of labor and can be accomplished quickly and easily.

FIGS. 7–11 show a second embodiment of a rack 210 made in accordance with the present invention. In this design, the base 240 includes a front receptacle 242 and a rear receptacle 244 connected together by a structural member 245. Projecting downwardly from the structural member 245 between the front and rear receptacles 242, 244 is a support leg 246, which extends to the ground and terminates at a flat plate 247. This base differs from the previous embodiment in that the rear receptacle 244 also serves as a rear support leg, extending all the way to the ground level and terminating at a foot 247. If the base 240 is tall, as shown here, it will have additional bracing 218, 220. (The height of the base may be tall or short in either embodiment.) Very tall bases may require additional bracing 218, 220. The rack that is assembled onto this base 240 has front and rear legs 12, 14 cut to the same length and inserted into their respective receptacles 242, 244. The legs 12, 14 preferably are secured to the receptacles 242, 244 by fasteners, which, in this preferred embodiment, are bolts 48, extending through holes 50 in the respective members that are being joined. In this preferred embodiment, both the front and rear receptacles 242 244 are preferably rectangular cross-section structural members, although other shapes of structural members could be used instead. The base 240 may be made of much thicker-walled, heavier-duty material than the legs 12, 14 of the rack.

In order to retrofit the rack 10 of FIG. 1 to form the rack 210 shown here, the foot plates at the bottoms of the legs 12, 14 are cut off, the rack 10 is lifted up, and the legs 12, 14 are inserted into the receptacles 242, 244 of the base 240 and secured in place. Of course, if this rack were being made originally, the foot plates would not be added to the legs 12, 14, and the legs 12, 14 would simply be inserted into their respective receptacles 242, 244 and secured in place.

The rack 210 shown in FIGS. 7–11 has the front leg 12 and its front receptacle 242 terminating at a desired elevation above the ground level, in this embodiment approximately three to six feet, and the support leg 246 is recessed from the front of the rack approximately six to twenty-four inches.

It will be obvious to those skilled in the art that modifications may be made to the embodiments described above without departing from the scope of the present invention.

What is claimed is:

1. A storage rack assembly for supporting products above the ground, comprising:
   a cantilevered base having
     a front; and
     a back; and
     defining forward and rear receptacles, at least said forward receptacle terminating at an elevation above the ground; and
     a support which extends to the ground and supports said base; and
   a storage rack supported on said base, including a forward leg received in and secured to said forward receptacle and a rear leg received in and secured to said rear receptacle, wherein said assembled base and storage rack define a recess that is at least six inches up from the ground and at least six inches back from the front of said forward receptacles.

2. A storage rack assembly for supporting products above the ground as recited in claim 1, and further comprising a splice member, which is received in said forward receptacle and in said forward leg; a first connector extending through said splice member and said forward receptacle to secure said splice member to said forward receptacle, and a second connector extending through said splice member and said forward leg to secure said splice member to said forward leg.

3. A storage rack assembly for supporting products above the ground as recited in claim 1, wherein said forward leg terminates at a higher elevation than said rear leg.

4. A storage rack assembly for supporting products above the ground as recited in claim 3, wherein said rear leg extends through said rear receptacle and rests on the ground.

5. A storage rack assembly for supporting products above the ground as recited in claim 1, wherein said forward and rear receptacles are made of thicker-walled members than said forward and rear legs.

6. A storage rack assembly for supporting products above the ground as recited in claim 1, wherein said support includes a base support leg that is substantially vertical.

7. A storage rack assembly for supporting products above the ground as recited in claim 1, wherein said rear receptacle extends to the ground to define a rear base leg.

8. A storage rack assembly for supporting products above the ground as recited in claim 1, wherein said rear receptacle is a C-shaped structural member.

9. A storage rack assembly for supporting products above the ground as recited in claim 4, wherein said rear receptacle is a C-shaped structural member.

10. A storage rack assembly for supporting products above the ground as recited in claim 1, wherein said storage rack includes a plurality of horizontal beams defining shelves supported on said forward and rear legs.

11. A storage rack assembly for supporting products above the ground as recited in claim 1, wherein said forward and rear receptacles and said forward and rear legs are vertical.

12. A storage rack assembly for supporting products above the ground, comprising:
   a cantilevered base having
      a front; and
      a back; and
      defining forward and rear receptacles, at least said forward receptacle terminating at an elevation above the ground; and
   a support which extends to the ground and supports said base, wherein said base defines a recess extending for at least six inches above ground level and at least six inches back from the front of the forward receptacle; and
   a storage rack supported on said base, including
      a vertical forward leg secured to said forward receptacle; and
      a vertical rear leg secured to said rear receptacle, with at least said forward leg terminating at an elevation above said recess; and
      a plurality of horizontal beams defining a plurality of shelves supported on said vertical forward and rear legs, wherein
   said forward and rear receptacles are made of a thicker-walled material than said forward and rear legs.

13. A retrofit support for a storage rack including front and rear legs, comprising:
   a base to be secured to front and rear legs of the storage rack, said base including a bottom portion to be positioned on a surface upon which the storage rack will rest, a front portion to support a bottom end of the front leg of the storage rack at an elevated position above the surface, and a rear portion that includes a rear receptacle to receive the rear leg of the storage rack, in which a first front-to-rear width dimension of the base at the elevated position is greater than a second front-to-rear width dimension of the base at a lesser elevation above the surface.

14. A retrofit support as recited in claim 13, and further including a storage rack mounted an said base, said storage rack including front and rear legs, wherein the base is constructed of a thicker walled material than the construction of the front and rear legs.

15. A retrofit support as recited in claim 13, wherein the front portion includes a front receptacle.

16. A retrofit support as recited in claim 15, and further including a storage rack mounted on said base, said storage rack having a front leg received in said front receptacle and a rear leg received in said rear receptacle, wherein at least one of the front and rear receptacles is constructed of a thicker walled material than the material of the front and rear legs.

17. A retrofit support as recited in claim 15, wherein the base includes a support leg positioned between the front and rear receptacles.

18. A retrofit support as recited in claim 17, wherein the support leg is positioned entirely between the front and rear receptacles.

19. A retrofit support as recited in claim 18, wherein the support leg is vertical.

20. A retrofit support as recited in claim 13, wherein the rear receptacle is substantially vertical.

21. A retrofit support as recited in claim 13, wherein the rear receptacle is a C-shaped structure.

22. A retrofit support as recited in claim 13, and further comprising a storage rack mounted on said base, said storage rack having front and rear legs, wherein the front leg is supported on the front portion of the base at an elevation above the surface, and the rear leg extends through the rear receptacle to the surface.

23. A retrofit support as recited in claim 13, and further comprising a rack mounted on said base, said rack having front and rear legs secured to said base, wherein said base defines an open space between the front leg and the surface.

24. A retrofit support as recited in claim 23, wherein the open space extends at least approximately six inches above the surface and extends from the front of the base to a point at least approximately six inches rearwardly from an imaginary vertical line extending through the front of the front leg.

25. A retrofit support for a storage rack including front and rear legs, comprising:
   a base adapted to be secured to the storage rack and to rest on a surface, the base having a front and a rear and including
      a front portion to support the front leg of the storage rack at an elevated position above the surface; and
      a rear portion that includes a rear receptacle to receive the rear leg of the storage rack;
   wherein said base defines an open space between the base and the surface on which it rests, said open space extending from an imaginary vertical line at the front of the base in a direction toward the rear of the base.

26. A retrofit support as recited in claim 25, and further comprising a storage rack having front and rear legs, said front leg being supported on said front portion and said rear leg being received in said rear receptacle, wherein the base is constructed of a thicker walled material than the material of the front and rear legs.

27. A retrofit support as recited in claim 25, wherein the front portion includes a front receptacle.

28. A retrofit support as recited in claim 27, and further comprising a storage rack having front and rear legs, said front leg being received in said front receptacle and said rear leg being received in said rear receptacle, wherein at least one of the front and rear receptacles is constructed of a thicker walled material than the material of the front and rear legs.

29. A retrofit support as recited in claim 27, wherein the base includes a support leg positioned between the front and rear receptacles.

30. A retrofit support as recited in claim 29, wherein the support leg is positioned entirely between the front and rear receptacles.

31. A retrofit support as recited in claim 29, wherein the support leg is vertical.

32. A retrofit support as recited in claim 25, wherein the rear receptacle is substantially vertical.

33. A retrofit support as recited in claim 25, wherein the rear receptacle includes a C-shaped structure.

34. A retrofit support as recited in claim 25, and further comprising a rack having front and rear legs, wherein said front leg is supported on the front portion of the base and said rear leg extends through the rear receptacle to the surface.

35. A retrofit support as recited in claim 25, wherein the open space extends at least approximately six inches above the surface and extends at least approximately six inches rearwardly from the imaginary vertical line.

* * * * *